Patented June 15, 1954

2,681,271

UNITED STATES PATENT OFFICE 2,681,271

PRODUCTION OF ANTIOXIDANTS

Charles Thomson Young Cowie, Norton-on-Tees, England, assignor to Imperial Chemical Industries Limited, a corporation of Great Britain No Drawing. Application May 7, 1951, Serial No. 225,051

Claims priority, application Great Britain May 25, 1950

2 Claims. (Cl. 44—74)

This invention relates to inhibitors of oxidation, peroxidation, polymerisation and gum formation in gasoline, aldehydes, fatty oils, vegetable oils, lubricating oils, ethers and similar compounds.

When, for example, liquid aldehydes are allowed to stand in contact with air, there is a tendency for them to be oxidised with the production of the corresponding acids. This oxidation may occur irrespective of the nature of the material of the container in which the aldehyde is stored, and may even be accelerated thereby.

In a similar manner, ethers tend to undergo an addition of oxygen on storage, with the formation of peroxides and/or hydroperoxides.

Acidity developed in an aldehyde may result in storage difficulties and may also be disadvantageous in many processes in which the aldehyde may be used, for example, in the production of synthetic resins, or in the hydrogenation to an alcohol. Similarly ether peroxidation is undesirable because in some cases ether peroxides are highly explosive.

Also, the prevention of oxidation in gasolines, vegetable oils, and lubricating oils may inhibit gum formation in these compounds.

According to the present invention we have now found that diamino durene or an alkylated or acylated derivative thereof has an inhibitory effect on the undesirable oxidation, polymerisation and gum formation reactions described above. The amount of durene derivative introduced into the aforementioned substances in order to prevent undesirable oxidation and polymerisation reactions may be varied over a wide range and will depend on the nature of the substance and the conditions to which it is to be exposed. For example, the addition of 0.001 to 1% of these inhibitors, based on the weight of the substance to be stabilised, is in general satisfactory for compounds such as gasolines, aldehydes, for example nonaldehyde, fatty oils, vegetable oils, lubricants and ethers, for example tetrahydrofuran.

It is preferred in the process of the present invention to employ diamino durene itself (i. e., 1:4-diamino 2,3,5,6-tetramethyl benzene), but alkylated durenes, for example, NN¹ tetramethyl diamino durene, NN¹ di-isopropyl diamino durene, and durene derivatives containing an acyl group, for example, N-ethyl N¹-acetyl diamino durene, may also be used.

Diamino-durene for use in the present process may be prepared by any convenient method. For example, durene may be nitrated, and the resulting dinitro durene converted to diamino durene by reduction. NN¹-tetramethyl diamino durene may be produced, for example, from diamino durene by treatment with methyl iodide under alkaline conditions. NN¹-di-isopropyl-diamino-durene may be produced, for example, by reacting dinitro or diamino durene with acetone in the presence of hydrogen, preferably under conditions of elevated temperature and pressure, and in the presence of a hydrogenation catalyst. Thus, the compound may be produced, for example by dissolving dinitro durene in an excess of acetone, and hydrogenating at an elevated temperature of 50 to 100° C., and a pressure of 20 to 50 atmospheres, in the presence of a platinum-on-charcoal catalyst.

N-ethyl N¹-acetyl diamino durene may be produced, for example, by acetylating durene, and subsequently partially reducing the diacetyl compound, using, for example, lithium aluminium hydride as the reducing agent. The reduction is preferably carried out in a solvent, for example, tetrahydrofuran, at an elevated temperature.

According to another feature of the invention, there are provided, as new compounds, NN¹-di-isopropyldiaminodurene, a white crystalline solid melting at 102° C. and N-ethyl-N¹-acetyl diamino durene, which is a white crystalline solid melting at 190° to 192° C.

EXAMPLE 1

In this example, the preparation of the various antioxidants, employed in Examples 2 to 5, is described.

Durene (1,2,4,5-tetramethyl benzene) was converted to dinitro-durene, and this was reduced to diaminodurene by the process described in "Organic Syntheses," volume 10, page 40, (1930).

$NN^1$ tetramethyl diamino durene 2 grams of diamino durene hydrochloride were converted to the free base, and this was refluxed for 6 hours with a mixture of 24 mls. of water, 6.4 grams of sodium carbonate, and 6.4 grams of methyl iodide. The reaction product was extracted with ether and yielded 1 gram of the NN¹ tetramethyl diaminodurene. This compound had a melting point of 72° C., and gave a dihydrochoride, containing two molecules of water of crystallisation, melting at 212° C.

$N$-ethyl $N^1$-acetyl diaminodurene

A second sample of diaminodurene was acetylated, to give NN¹-di-acetyl diaminodurene, and 3.6 grams of the di-acetyl compound reduced with lithium aluminium hydroxide in boiling tetrahydrofuran. 2.4 grams of a compound identified as N-ethyl N¹-acetyl diaminodurene were isolated. This compound melted at 190° to 192° C.

NN¹-di-isopropyl diaminodurene 6 grams of dinitrodurene were dissolved in 50 mls. of acetone containing 0.5 gram of a catalyst comprising 30% by weight of platinum-on-charcoal. The mixture was then hydrogenated at 70° C. and 30 atmospheres hydrogen pressure for 48 hours in an autoclave. The product, after the removal of catalyst and excess solvent, yielded 5 grams of a white crystalline solid, which after recrystallisation from methanol melted at 102° C. This compound, analysis, was identified as NN¹-di-isopropyl diaminodurene.

EXAMPLE 2

Four 15 ml. portions of nonaldehyde were exposed to atmospheric oxidation at room temperature. Three of the portions contained .00033 mole of an inhibitor while the fourth served as a standard for comparison. The extent of oxidation was measured by the development of acidity in the samples. Thus, the acid values given in the table below refer to the milligrams of potassium hydroxide required to neutralise the acid formed per gram of material.

| Inhibitor | Acid value | |
|---|---|---|
| | After 192 hours | After 480 hours |
| None | 231 | 344 |
| Diamino durene | 92 | 203 |
| NN¹-tetramethyl diaminodurene | 107 | 213 |
| N-ethyl N¹-acetyl diaminodurene | 128 | 223 |

EXAMPLE 3

Three 50 ml. portions of peroxide-free tetrahydrofurfuryl alcohol were exposed to atmospheric oxidation at room temperature. Two of the portions contained 10 mgs. of inhibitor; the third contained no inhibitor and was used as a standard for comparison. The peroxidic oxygen content of each portion was measured at various times and the results are given in the table below.

| Inhibitor | Peroxidic Oxygen Content, p. p. m., After— | | | |
|---|---|---|---|---|
| | 6 days | 20 days | 48 days | 55 days |
| None | 95 | 1,148 | 3,321 | 3,590 |
| Diamino durene | 0 | 0 | 0 | 0 |
| NN¹-di-isopropyl diaminodurene | 29 | 109 | 175 | 199 |

EXAMPLE 4

The effect of the inhibitors upon the prevention of oxidation in gasoline was measured by the following procedure. 50 mls. of a thermally cracked gasoline containing 0.04% by weight of inhibitor was placed in a bomb. Oxygen was pumped into the bomb until the pressure was 100 lbs./sq. inch. The bomb was then immersed in a bath at 100° C. The pressure at first increased up to a maximum, which was maintained for a certain length of time, after which a slow pressure decrease was recorded. The induction period in the table below represents the time which had elapsed from immersing the bomb in the bath to the time when the pressure inside the bomb had fallen to 2 lbs./sq. inch less than the steady maximum pressure.

| Inhibitor | Induction Period (Minutes) |
|---|---|
| None | Less than 30. |
| Diamino durene | 204. |

EXAMPLE 5

The influence of diamino durene upon the oxidation of the methyl esters of linseed oil (essentially methyl lineoleate) was determined by oxidising 5 mls. portions of esters in a direct oxygen absorption apparatus maintained at a temperature of 94° C. Oxidation commenced after an induction period; the table below gives the induction period for the esters alone and for the esters together with diamino durene.

| Inhibitor | Percent by weight of Inhibitor | Induction Period (minutes) |
|---|---|---|
| None | | 10 |
| Diamino durene | 0.02 | 75 |
| Do | 0.2 | 360 |

I claim:
1. A new composition of matter comprising a gasoline subject to deterioration arising from peroxide formation together with, as an inhibitor of such deterioration, from 0.001% to 1% by weight of diaminodurene.
2. A new composition of matter comprising a furan subject to deterioration arising from peroxide formation together with, as an inhibitor of such deterioration, from 0.001% to 1% by weight of diaminodurene.

References Cited in the file of this patent

UNITED STATES PATENTS

| Number | Name | Date |
|---|---|---|
| 2,067,686 | Semon | Jan. 12, 1937 |
| 2,273,862 | Hamilton et al. | Feb. 24, 1942 |
| 2,323,948 | Von Bramer | July 13, 1943 |
| 2,451,642 | Watson | Oct. 19, 1948 |